June 5, 1951
C. D. PROSSER
2,555,559
WAGON HITCH LEVELING DEVICE
Filed Aug. 7, 1948
2 Sheets-Sheet 1
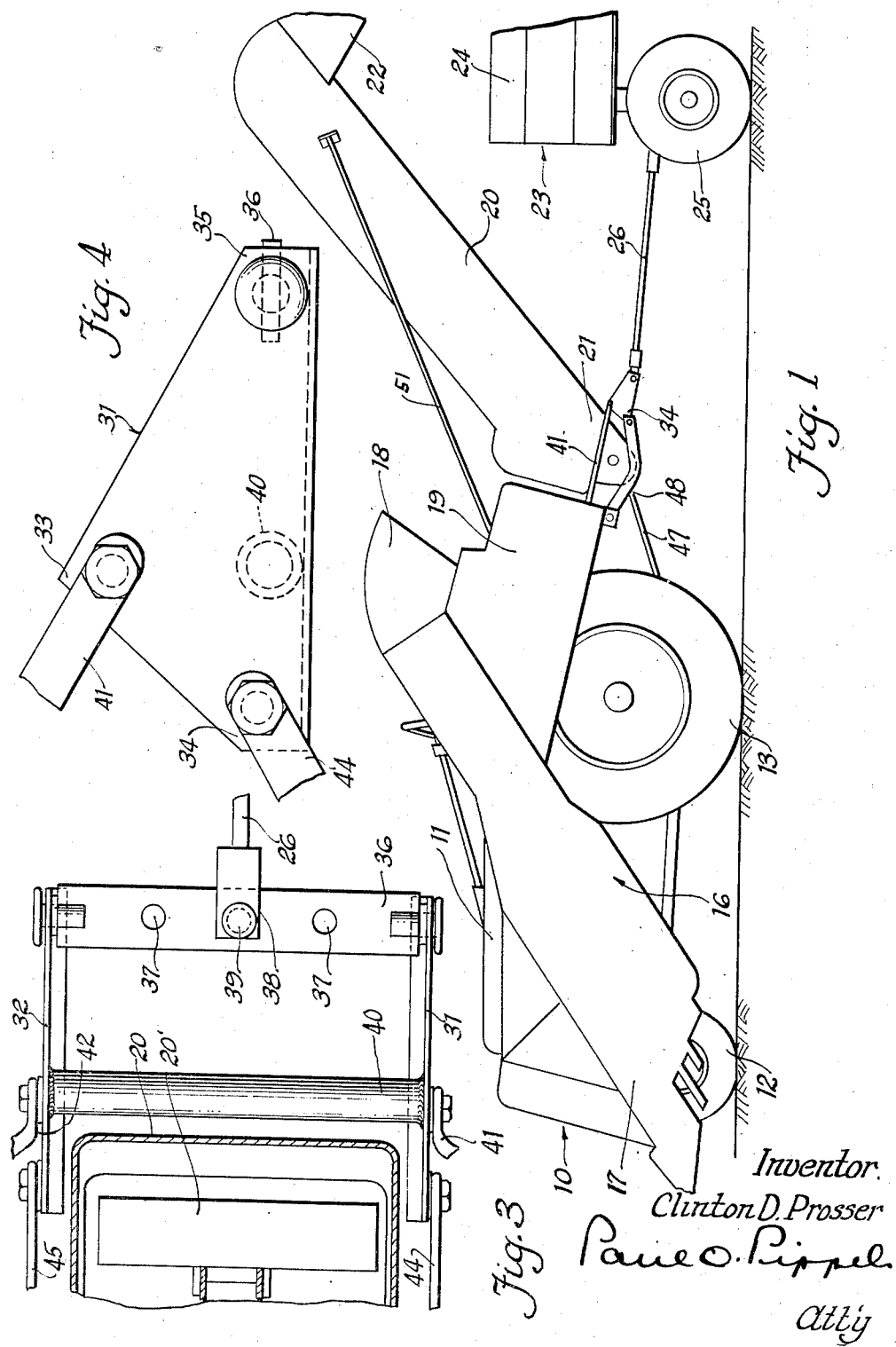
Inventor.
Clinton D. Prosser
Paul O. Pippel
Atty

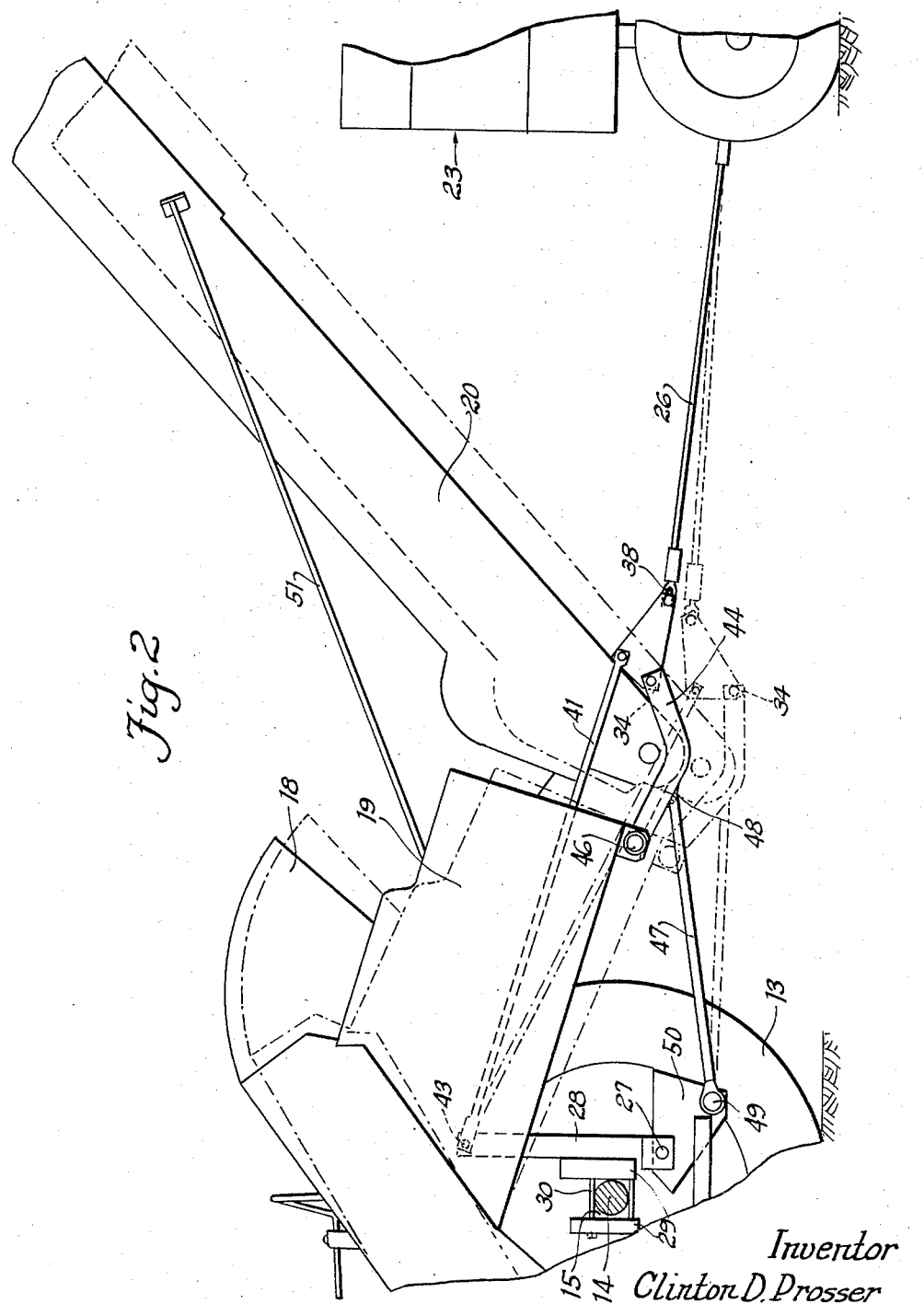

Patented June 5, 1951

2,555,559

UNITED STATES PATENT OFFICE 2,555,559

WAGON HITCH LEVELING DEVICE

Clinton D. Prosser, Rock Island, Ill., assignor to International Harvester Company, a corporation of New Jersey Application August 7, 1948, Serial No. 43,102

4 Claims. (Cl. 56—218)

This invention relates to a new and improved wagon hitch leveling device and has for one of its principal objects the provision of means for maintaining the hitch between vehicles at a substantially uniform height above the ground regardless of the angular tilting of the pulling vehicle.

An important object of this invention is to provide a hitch for joining a wagon to a harvester in such a manner that the height of the wagon tongue remains relatively constant regardless of vertical adjustment of the pulling harvester.

Another important object of this invention is to provide a hitch device for joining a corn picker and a trailing wagon and including linkage associated with the corn picker and the hitch for maintaining the wagon tongue at a relatively uniform position above the ground line.

A still further object of this invention is the provision in a tractor-mounted corn picker of hitch means associated with the rearwardly extending portions of the corn picker for receiving the forwardly extending tongue of a trailing wagon and linkage means associated with the hitch device for maintaining the hitch connection of the wagon tongue at a relatively constant height above the ground compensating for the vertical adjustment of the corn picker with respect to the tractor.

Another and still further object of this invention is to provide a hitch device interposed between a tractor mounted corn picker and a trailing wagon having pivotal link means connected to the vertically adjustable corn picker and to the non-adjustable tractor for the purpose of maintaining the wagon tongue substantially level and thereby maintaining a more efficient line of draft.

Other and further important objects of this invention will become apparent from the disclosures in the following specification and accompanying drawings.

In the drawings:

Fig. 1 is a side elevational view of a tractor-mounted corn picker and a trailing wagon joined by the hitch mechanism of this invention.

Fig. 2 is an enlarged view of a portion of the device as shown in Fig. 1, parts thereof being in section.

Fig. 3 is a top plan view of the hitch mechanism of this invention.

Fig. 4 is a side view detail of the hitch.

As shown in the drawings, the reference numeral 10 indicates generally a tractor of the tricycle type having a relatively narrow longitudinally extending body 11 supported at its front by steerable wheels 12 and at its rear by widely spaced large traction wheels 13. As best shown in Fig. 2, the traction wheels 13 are mounted on a transversely extending axle 14. Portions of the axle 14 are enclosed within a stationary housing structure 15.

A harvester such as corn picker 16 is mounted on the tractor 10 for movement therewith. The picker 16 includes gathering units 17 disposed longitudinally of and adjacent the narrow tractor body 11. These gathering units, which may be positioned on both sides of the tractor body, are adapted to harvest standing corn and elevate the ears of corn upwardly and rearwardly to a discharge portion 18 of the corn picker whereupon the ears are dropped into an integral hopper or husking unit 19 from which they are fed to an upwardly and rearwardly extending wagon elevator 20. The wagon elevator 20 is provided with a conveyor or the like (20') which carries the corn from the hopper 19 through the bottom portion 21 of the elevator and causes it to be discharged from the upwardly and rearwardly positioned spout 22 on the elevator 20. The discharge spout 22 is located above a wagon 23. The wagon includes a box portion 24, wheels 25, and a forwardly extending tongue 26.

The corn picker 16 comprising the gathering unit 17, the hopper 19, and wagon elevator 20 is carried as an integral unit by the pivotal attachment at 27 to a fixed part of the tractor 10. The pivotal attachment 27 is on a vertically disposed structural member 28 carried on the axle housing 15 by means of clamp members 29 joined by bolts 30.

For effective operation of the corn picker it is oftentimes necessary to adjust the gathering units 17 vertically. This vertical adjustment is accomplished by the swinging of the entire corn picker about its pivotal axis 27. At the present time trailing wagons have their tongues attached directly to the bottom of the wagon elevator or hopper which extends rearwardly of the tractor. As a result the wagon tongue raises and lowers simultaneously with the raising and lowering of the corn picker. When the gathering points are positioned close to the ground the hitch attachment of the wagon tongue is relatively high. When the gathering points of the corn picker are raised the rearwardly extending portion of the corn picker including the hopper and elevator are lowered considerably and the wagon tongue thus assumes a new low position. The tractor 10 supplies the pulling force for the trailing wagon indirectly through its attachment to the corn picker. The pulling force should be applied at a relatively constant level above the ground line in order to obtain effective draft of the wagon by the tractor. However, when the wagon tongue is shifted throughout a wide vertical range the draft of the wagon becomes undesirable. As stated above it is an important object to overcome this great variance in wagon tongue positioning.

Substantially triangular plates 31 and 32, as best shown in Figs. 3 and 4, are the basis for the compensating hitch mechanism. These plates are transversely spaced apart in horizontal alignment and are disposed substantially vertically so that the angles 33 and 34 are located in a forward position adjacent the rear of the tractor-mounted corn picker and the single angle 35 is disposed rearwardly toward the trailing wagon 23. A first cross member 36 joins the plates 31 and 32 at their angle 35. This cross member 36 is relatively flat and is provided with spaced apertures 37. The wagon tongue 26 is provided with a forwardly extending clevis 38 which slides over the flat member 36 and by means of a headed pin 39 the clevis is pivotally attached to one of the apertures 37 for horizontal swinging movement.

A second cross member 40 in the form of a tube joins the triangular plates 31 and 32 constituting a rigid attachment therebetween. As best shown in Fig. 2, the top angles 33 of the triangular plates are joined by connecting links 41 and 42 which extend forwardly and upwardly to a pivotal attachment at 43 on the vertical supporting member 28 which is a fixed part of the tractor 10. Bracket members 44 and 45 are fixed to the underside of the hopper 19 at 46 and extend rearwardly around and beneath the lower end of the wagon elevator 20 forming a cradle therefor. The rearward ends of the brackets 44 and 45 are pivotally attached to the lower forward angles 34 of the triangular plates 31 and 32. The members 44 and 45 thus carry one angle of the triangular plates for direct movement with the corn picker.

Brace members 47 are welded or otherwise fastened to the underside of the bracket members 44 and 45 at 48 and are attached at their other ends at 49 on a plate 50 which is mounted on the axis 27. The plate 50 pivots with the entire corn picker as it moves about the axis 27. The links 47 thus brace and support the bracket members 44 and 45 in order to conveniently carry the great load imposed thereon by the upwardly and rearwardly extending wagon elevator 20. An additional tie or brace member 51 joins an upper part of the elevator to the hopper member 19 thus making the corn picker a more unitary construction. The top angle 33 is controlled by the links 41 and 42 which are attached to a fixed tractor support.

In operation, when the corn picker gathering points are shifted vertically the angle 34 of the triangular plates 31 and 32 moves a corresponding distance directly with the shifting of the corn picker. As shown in full lines in Fig. 2 the angle 34 is in one position and in adjusted position this angle 34 has moved a considerable distance downwardly. If the wagon tongue 26 were attached directly to this point on the corn picker it would have moved through a like distance. However, in the present instance the wagon tongue 26 is attached to the rearwardly extending angle 35 of the triangular plates 31 and 32 and by means of the fixed length links 41 and 42 the triangular plates are rotated about the angle 34 so that the great vertical movement of the angle 34 of the triangular plates is minimized at the rearwardly disposed angle 35 of the triangular plates. Rotation of the triangular plate unit thus compensates for the great vertical movement of the corn picker and there is only a small resultant change in position of the wagon tongue. The wagon tongue therefore remains at a relatively constant level throughout full adjustable movement of the corn picker providing for a more efficient draft angle between the tractor and the trailing wagon.

Numerous details of construction may be varied through a wide range without departing from the principles disclosed herein and I therefore do not propose limiting the patent granted hereon otherwise than as necessitated by the appended claims.

I claim:

1. A hitch leveling device for placement between a pulling vehicle and a trailing vehicle in which the pulling vehicle has a fixed portion and a portion tiltable vertically thereon, comprising plate means disposed in a substantially vertical plane between the vehicles, said plate means pivotally mounted on the tiltable portion of said pulling vehicle, link means pivotally attached at one end to the fixed portion of said pulling vehicle and pivotally attached at its other end to said plate means at a position spaced from the pivotal attachment of the plate means to the tiltable portion, and a tongue on said trailing vehicle pivotally attached on said plate means at a position spaced from said previous two pivotal attachments, said link means arranged and constructed to minimize vertical movement of the portion of said plate means carrying the trailing vehicle tongue.

2. A device as set forth in claim 1 in which the plate means is triangular in shape with the three angles thereof constituting points of pivotal attachment.

3. A device as set forth in claim 1 in which the plate means includes a pair of laterally spaced aligned triangular plates, cross members spanning and fastened to each of said spaced triangular plates, and the three angles of said triangular plates constituting points of pivotal attachment of said tiltable portion of the pulling vehicle, the link means, and said trailing vehicle tongue.

4. A device as set forth in claim 3 in which two of the angles of said triangular plates face forwardly toward the pulling vehicle, the upper of said angles receiving the link means of the fixed portion of the pulling vehicle and the lower of said angles receiving the pivotal attachment of the tiltable portion of said pulling vehicle, and the third angle of the triangular plates disposed rearwardly for attachment by the trailing vehicle tongue.

CLINTON D. PROSSER.

REFERENCES CITED

The following references are of record in the file of this patent:

UNITED STATES PATENTS

| Number | Name | Date |
|---|---|---|
| 1,307,781 | Lawrence | June 24, 1919 |
| 1,922,376 | Krause | Aug. 15, 1933 |
| 2,369,436 | Court | Feb. 13, 1945 |